July 29, 1958  M. G. POTTER  2,845,551
SUBMERSIBLE MOTOR
Filed Oct. 4, 1955

INVENTOR
Marion G. Potter,
BY
ATTORNEY

United States Patent Office 2,845,551
Patented July 29, 1958

2,845,551

SUBMERSIBLE MOTOR

Marion G. Potter, Lima, Ohio, assignor to Westinghouse Electric Corporation, East Pittsburgh, Pa., a corporation of Pennsylvania Application October 4, 1955, Serial No. 538,431

5 Claims. (Cl. 310—87)

My invention relates, generally, to electric motors and, more particularly, to electric motors of the submersible type, that is, motors which are intended to operate under water and drive submersible pumps, as in a well.

Some of the advantages of utilizing a submerged motor mounted below the pump are:

(1) Simplicity of arrangement since no building or enclosure of any type is required at the top of the well to house the pump or any of its related equipment.

(2) Motor is directly connected close to the pump. This is impossible with a deep-well pump of any other type.

(3) No recirculation of water to lower the efficiency of the system.

(4) Requires no priming, since the pump is below the water level.

(5) Motor is water cooled.

(6) High capacities and pressure are possible for small diameter wells.

(7) Economy of operation because of high efficiency.

(8) Easier to remove from the well, since only one pipe is required.

(9) Quiet operation. Motor and pump are at the bottom of the well where any noise is not noticeable.

(10) Related equipment, such as controls and water tank, can be located conveniently.

Submersible motors may be of the three basic types:

(1) Motors of the dry type which are completely sealed so tightly that no water can enter the motor housing which is filled with an insulating oil or oil emulsion. Some provision must be made for change in volume of the oil because of heating and cooling.

(2) Motors of the semi-wet type which permit the water to circulate through the motor for lubrication and cooling. The winding is of conventional varnish-insulated wire, and the entire winding is potted in a suitable plastic or is sealed inside a metallic container to prevent water from grounding or shorting the winding.

(3) Motors of the wet type which have no fluid seals so that the water can circulate freely through the motor and around the motor windings. Each wire of the winding is insulated from the water.

This invention relates to motors of the wet type which have the following advantages:

(1) No fluid seals, which are expensive, are required.

(2) There is no material, such as oil, which is required in a sealed motor, that could leak into the well to contaminate the water.

(3) Winding the motor with wire properly insulated to protect it from the water is cheaper and more reliable than attempting to seal off the windings from the water.

(4) Better cooling of all parts is possible.

Such a motor must be provided with a thrust bearing capable of carrying the thrust load of a centrifugal pump. The thrust load of the pump results from the head and tank pressure which must be overcome by the multiple stages of the centrifugal pump. Because the diameter of a motor intended for use in a well is small (3¾ inches maximum diameter for use in a 4 inch well casing, for example), the rotor must be small in diameter, and the shaft is very small in diameter compared to its length. The thrust load, therefore, if carried through the rotor shaft as a column, may cause the shaft to buckle.

The principal object of the invention is to provide a submersible electric motor of novel construction capable of carrying high thrust loads and cooled and lubricated by circulation of water within the motor.

Another object of my invention is to preclude the possibility of buckling the shaft of a motor of small diameter having a relatively high thrust capacity.

A more specific object of my invention is to provide an electric motor having a thrust bearing which removes all thrust load from the portion of the motor shaft on which the rotor is pressed.

Another object of my invention is to provide an electric motor having a self-aligning thrust bearing.

Still another object of my invention is to provide a self-lubricating thrust bearing having a high pressure lubricating film between bearing surfaces.

A further object of my invention is to provide an electric motor of the wet type having parts which may be readily manufactured and assembled.

Other objects of my invention will be explained fully hereinafter or will be apparent to those skilled in the art.

In accordance with one embodiment of my invention, the stator core for a motor is built up of steel punchings which are stacked and welded on lines perpendicular to the face of the punchings. The core is coated with a suitable material, such as a zinc pigmented material, or other material impervious to water, to make it sufficiently resistant to corrosion caused by well water. The core is wound with wire insulated with a waterproof insulation and the core is then pressed into a stainless steel frame. The rotor core is built up in a similar manner with copper bar conductors inserted in the core and brazed to end rings. The core is then pressed onto a stainless steel shaft. The shaft is supported by guide bearings provided in end brackets disposed in the frame. A self-aligning thrust bearing is disposed near the top end of the shaft, which extends beyond the top end cover sufficiently to be connected to the shaft of a pump. The motor is attached to the pump by stud bolts threaded into the end cover. The shaft bearings and the thrust bearing are lubricated by the well water which circulates within the motor for cooling and lubricating purposes. The thrust bearing is so constructed that a high pressure lubrication film of water is built up between the friction surfaces.

For a better understanding of the nature and objects of the invention, reference may be had to the following detailed description, taken in conjunction with the accompanying drawing, in which.

Figures 1, 2, 3, 4:
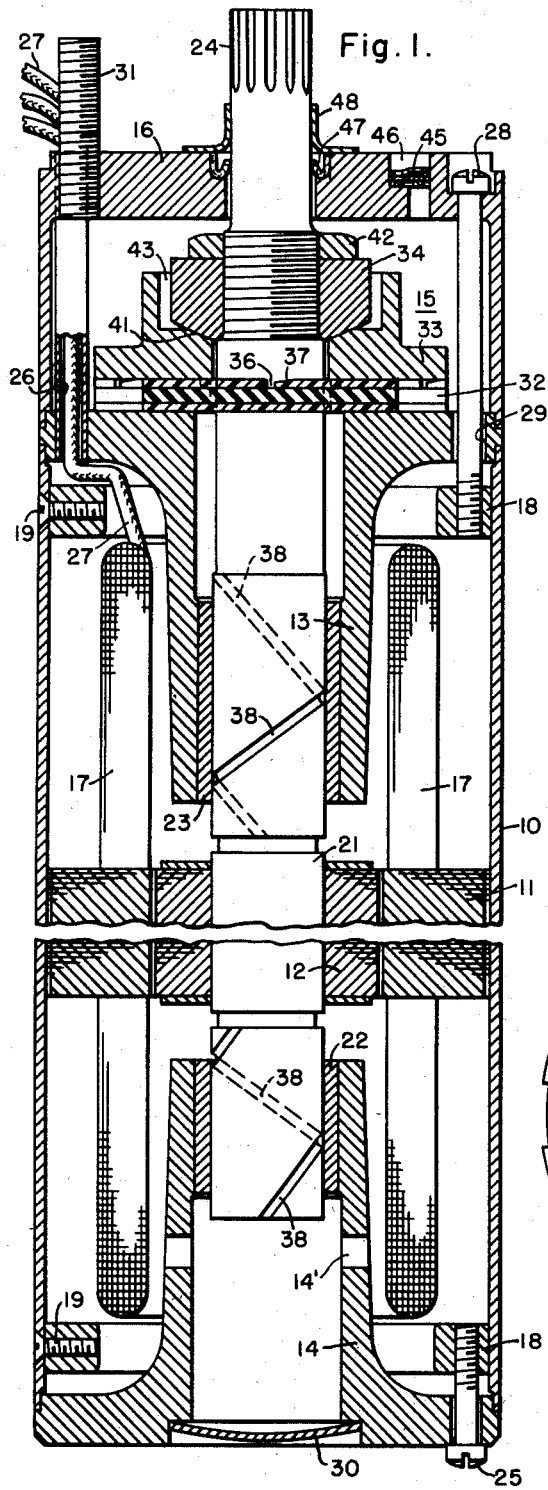
Figure 1 is a view, in vertical section, of an electric motor embodying the principal features of the invention, the section through the thrust washer being taken along the line a—a of Fig. 3.
Fig. 2 is a view, in plan, of a thrust runner utilized in the thrust bearing for the motor.
Fig. 3 is a view, in plan, of a thrust washer for the thrust bearing.
Fig. 4 is a view, in plan, of one of the punchings for the motor stator.

Referring to the drawing, and particularly to Fig. 1, the electric motor shown therein comprises a generally cylindrical frame 10, a stator core 11, a rotor 12, an upper end bracket 13, a lower end bracket 14, a thrust bearing 15, and an end cover 16. The frame 10 may be fabricated from stainless steel or other corrosion resistant material.

The stator core 11 is a laminated core built up from sheet steel punchings which are stacked in proper alignment and then welded in several places on their outside periphery in lines perpendicular to the face of the punchings. These punchings are notched, as shown at 11' in Fig. 4, so that when stacked in proper alignment, four channels are formed in the outside of the stator core to allow circulation of water from the top of the motor and the thrust bearing down through holes 14' in the lower bracket 14. This flow path causes the water used for internal cooling and lubrication to be cooled by contact with the frame 10 around which all the water being pumped passes.

After the punchings are assembled, they may be coated with a suitable material, such as a zinc pigmented material, or other material impervious to water, to give the core sufficient resistance to corrosion, or the punchings may be coated or treated in any suitable manner before assembly to make them corrosion resistant. The stator windings 17 may be formed from wire which is covered with a waterproof insulation, such as polyethylene, which is preferably covered with a coating of nylon extruded over the polyethylene. After the stator core is wound, it may be pressed into the cylindrical frame 10. A ring 18 is then fastened near each end of the frame by means of screws 19 which extend through the frame 10 into the rings 18. The rings 18 may be spot-welded or brazed in place if desired.

The rotor 12 is built up of sheet steel punchings having suitable openings near their periphery for receiving copper bar conductors which are inserted in the openings and brazed to end rings to form a squirrel cage winding. The rotor core is made corrosion resistant in the same manner as the stator core. The rotor core is then pressed onto a stainless steel shaft 21. The shaft 21 is of sufficient length to extend through the core on the lower end far enough to be supported by a sleeve bearing 22 which is mounted in the lower end bracket 14. The upper end of the rotor shaft 21 is supported by a sleeve bearing 23 mounted in the upper end bracket 13. The shaft 21 extends through the thrust bearing 15 and the end cover 16. The upper end of the shaft 21 has an extension 24 adapted to be connected to the shaft of a centrifugal pump (not shown) to which the motor may be attached.

The end brackets 13 and 14 are so designed that both brackets may be made from like castings. The lower bracket 14 is retained in the frame 10 by screws 25 which are threaded into the lower end ring 18. The upper end bracket 13 has its outside face machined perpendicular to the axis of the bearing 23 to position a thrust washer square with the axis of the shaft. The bracket 13 has openings 26 for lead wires 27 to pass from the stator winding to the outside of the motor. The lower end bracket 14 is so constructed that a suitable plate 30 may be pressed into the center opening to seal the motor to hold the water with which the motor is filled prior to assembly with a pump. This bracket is also provided with sufficient holes 14' in the body to allow circulation of cooling and lubricating water. This arrangement provides a settling cavity around ring 18 and down to the inside face of bracket 14 to allow any contaminant, dirt, or products of wear to settle out and not be carried through the motor.

The end cover 16 is generally of a cup shape. The solid end of the cover has a central hole of suitable size to allow the rotor shaft to pass through. The cover 16 is preferably designed to fit on a pump with which the motor is to be used. Four holes are provided near the periphery of the cover to permit through bolts 28 to pass through the cover and through openings 29 in the upper end bracket 13 into tapped holes in the upper end ring 18, thereby securing the end cover 16, the upper end bracket 13, and the motor frame 10 together. The motor may be provided with a suitable number of stud bolts 31 which are threaded into the end cover 16 for mounting the motor on a pump.

As previously explained, the thrust bearing 15 is located at the upper end of the motor so that no thrust load is imposed on the portion of the shaft 21 on which the rotor core 12 is pressed. In previously known motors of this general type, the thrust bearing has been located at the lower end of the motor. This caused the thrust load imposed by the pump to be carried through the rotor shaft. Because of the size and general construction of a motor of the present type, the shaft must be small in diameter and relatively long as compared to the diameter. This is particularly true of motors to be utilized in deep walls, which are often of small diameters, 4 inch diameter well casings being frequently used. Carrying the thrust load through the thin shaft to a thrust bearing at the bottom causes a column effect and results in bending of the shaft and rotor. This will cause locking of the rotor. In order to overcome this difficulty, the air gap of conventional motors must be made larger than normal. This reduces the efficiency of the motor.

In the present structure, the thrust bearing 15 is located at the upper end of the motor as close as possible to the shaft extension 24 which carries the thrust load of the pump. As shown, the thrust bearing 15 comprises a thrust washer 32, a thrust runner 33 and a thrust collar 34. The thrust washer 32 may consist of two rigid plates of suitable material bonded to opposite sides of a layer of resilient material, such as a synthetic elastomeric material, with the upper plate divided into segments by radial grooves 36, as shown in Fig. 3, which are capable of slight tilting movement. The thrust washer 32 has a center hole 35 of the proper diameter to center itself around the shaft 21. One side of the thrust washer 32 is positioned against the machined face of the upper end bracket 13. The thrust runner 33 runs against the opposite side of the thrust washer 32. The thrust washer is not fastened to either the end bracket 13 or the thrust runner 33. Thus the thrust washer is prevented from rotating under normal conditions by friction only.

The thrust washer 32 is normally stationary. However, if the friction between the thrust runner 33 and the thrust washer 32 becomes too great, due to the presence of sand or other foreign matter between the engaging surfaces, for example, the thrust washer will rotate on the surface of the bracket 13 and relieve the excessive load on the motor. This condition will usually result in overload current which will cause the motor to be disconnected by an external protective device, but the rotation of the thrust washer will prevent a locked rotor condition which might result in burning out the winding.

As previously mentioned, the upper face of the thrust washer 32, against which the face of the thrust runner 33 runs, is divided into segments by grooves 36 and the edges of the segments are bevelled at 37, so that rotation of the thrust runner will cause the water in the motor to be forced between the engaging surfaces to build up a high pressure lubricating film. The thrust runner 33, which rotates with the rotor shaft, has a smooth face suitable for running against the upper face of the thrust washer 32. As shown in Fig. 1, the shaft 21 has helical grooves 38 in the portions of the shaft supported in the bearings 22 and 23, thereby causing water to flow along the shaft to lubricate these bearings.

As shown in Fig. 1, the hub of the thrust runner 33 opposite the face which runs against the thrust washer 32 is concave in shape with a spherical surface 41 which fits against the thrust collar 34. The lower face of the collar 34 is convex in shape to mate with the concave surface of the thrust runner 33. In this manner, the thrust runner is permitted to align itself so that its lower face will be flat on the thrust washer at all times.

The thrust collar 34 is secured to the shaft 21, as by being threaded on the shaft and locked in place by a suitable locking device, such as a lock nut 42. The collar is square and fits into a square cavity 43 provided in the upper surface of the thrust runner 33. The cavity 43 is slightly larger than the thrust collar 34. Thus, the thrust runner is caused to rotate with the shaft 21, but the alignment of the thrust runner with the thrust washer is not restricted. It will be noted that the diameter of the opening 44 in the thrust runner is greater than the diameter of the shaft 21. The metal parts of the thrust bearing are preferably composed of stainless steel or other corrosion resisting material.

In operation, the motor is filled with water and submerged in a well. The grooves 38 in the shaft cause water to flow from the bottom of the motor up through bearing 22, the air gap between the stator and rotor, through bearing 23 and through the thrust bearing 15, thus lubricating the bearings. The water returns to the bottom through holes in the face of bracket 13, the passages formed by the notches 11' and the openings 14', thus flowing in contact with the frame 10 which is cooled by the outside water. The water also flows over the winding 17 to cool it. A filter 45 is provided in an opening 46 in the end cover 16 to permit breathing. A seal 47 and a sand slinger 48 are provided around the extension 24 to prevent dirt from entering the motor.

From the foregoing description, it is apparent that I have provided a submersible motor which is composed of relatively simple parts and which may be readily assembled. The thrust bearing is so located in the motor that no thrust load is imposed on the portion of the rotor shaft on which the rotor core is pressed. Thus bending of the shaft is prevented. Furthermore, all of the bearings in the motor are lubricated, and the motor is cooled, by the water which is circulated within the motor by the spiral grooves in the shaft. The present motor is particularly suitable for utilization in well casings of a relatively small diameter.

Since numerous changes may be made in the above described construction and different embodiments of the invention may be made without departing from the spirit and scope thereof, it is intended that all matter contained in the foregoing description or shown in the accompanying drawings shall be interpreted as illustrative and not in a limiting sense.

I claim as my invention:

1. In a submersible electric motor, in combination, a generally cylindrical frame, an upper end bracket and a lower end bracket disposed in the frame, a rotor shaft rotatably mounted in said end brackets, bearing members in said brackets for supporting said shaft, grooves in said shaft within said bearing members for causing liquid to flow upwardly along said shaft, a thrust washer disposed around the shaft upon the upper end bracket, radial grooves in the thrust washer for causing liquid to flow outwardly from the shaft to lubricate the washer, a thrust runner disposed upon the thrust washer, said washer being rotatable by excessive friction between the runner and the washer, and a thrust collar disposed upon the thrust runner, said thrust collar being attached to the rotor shaft and the thrust runner being rotatable with the thrust collar.

2. In a submersible electric motor, in combination, a generally cylindrical frame, an upper end bracket and a lower end bracket disposed in the frame, a rotor shaft rotatably mounted in said end brackets, bearing members in said brackets for supporting said shaft, grooves in said shaft within said bearing members for causing a liquid to flow upwardly along said shaft, a laminated thrust washer disposed upon the upper end bracket, a thrust runner disposed upon the thrust washer, grooves in the upper lamination of the thrust washer for causing a liquid to be forced outwardly from the shaft to lubricate the washer between the thrust washer and the thrust runner, said washer being rotatable with said runner under predetermined conditions, and a thrust collar disposed upon the thrust runner, said thrust collar being attached to the rotor shaft and having a curved surface engaging a curved surface on the thrust runner, the thrust runner being rotatable with the thrust collar but capable of limited movement relative thereto.

3. In a submersible electric motor, in combination, a generally cylindrical frame, an upper end bracket and a lower end bracket disposed in the frame, a rotor shaft rotatably mounted in said end brackets, bearing members in said brackets for supporting said shaft, grooves in said shaft within said bearing members for causing a liquid to flow upwardly along said shaft, a thrust washer disposed around the shaft upon the upper end bracket, grooves in the thrust washer for causing the liquid to be forced outwardly from the shaft to lubricate the washer, a thrust runner disposed upon the thrust washer, said washer being rotatably by excessive friction between the runner and the washer, and a thrust collar disposed upon the thrust runner, said thrust collar being attached to the rotor shaft and having a curved surface engaging a curved surface on the thrust runner, said thrust runner being rotatable with the rotor shaft and self-alignable with the thrust washer.

4. In a submersible electric motor, in combination, a generally cylindrical frame, an upper end bracket and a lower end bracket disposed in the frame, a stator core disposed in said frame between said end brackets, longitudinal channels in the outer surface of said core, a rotor shaft rotatably mounted in said end brackets, bearing members in said brackets for supporting said shaft, grooves in said shaft within said bearing members for causing a liquid to flow upwardly along said shaft, said liquid returning to the lower end of said shaft through said channels in the core, a thrust washer disposed around the shaft upon the upper end bracket, grooves in the thrust washer for causing the liquid to be forced outwardly from the shaft to lubricate the washer, a thrust runner disposed upon the thrust washer, and a thrust collar disposed upon the thrust runner, said thrust collar being attached to the rotor shaft and having a curved surface engaging a curved surface on the thrust runner, said thrust runner being rotatable with the rotor shaft and self-alignable with the thrust washer, said thrust washer being rotatable by excessive friction between the washer and the thrust runner.

5. A vertical submersible electric motor comprising a stator member and a rotor member, the stator member including a frame member, a stator core supported in the frame member, said stator core providing a plurality of vertical pasages between the core and the frame member, upper and lower end brackets attached to the frame member, said end brackets having bearings mounted therein, the rotor member having a shaft supported in said bearings, a laminated resilient thrust bearing for the shaft disposed above the upper end bracket, radial grooves on the thrust bearing, said motor being adapted to be filled with liquid, and means on the shaft for effecting circulation of said liquid upwardly through said shaft bearings and outwardly through said radial grooves and downwardly through said vertical passages for lubricating the bearings and cooling the motor.

References Cited in the file of this patent

UNITED STATES PATENTS

| | | |
|---|---|---|
| 1,982,937 | Walter | Dec. 4, 1934 |
| 2,369,440 | Curtis | Feb. 13, 1945 |
| 2,654,848 | Schaefer | Oct. 6, 1953 |
| 2,687,695 | Blom | Aug. 31, 1954 |

FOREIGN PATENTS

| | | |
|---|---|---|
| 628,541 | Germany | Apr. 6, 1936 |
| 899,828 | Germany | Dec. 17, 1953 |
| 903,720 | Germany | Feb. 8, 1954 |